June 30, 1964   J. IVAN   3,138,998
SURFACE FINISHING APPARATUS
Filed July 25, 1960   7 Sheets-Sheet 1

INVENTOR.
BY  Josef Ivan

June 30, 1964   J. IVAN   3,138,998
SURFACE FINISHING APPARATUS
Filed July 25, 1960   7 Sheets-Sheet 4

INVENTOR.
BY Josef Ivan

INVENTOR.
BY Josef Ivan

June 30, 1964

J. IVAN 3,138,998

SURFACE FINISHING APPARATUS

Filed July 25, 1960

INVENTOR.

BY Josef Ivan

June 30, 1964  J. IVAN  3,138,998
SURFACE FINISHING APPARATUS
Filed July 25, 1960  7 Sheets-Sheet 7

Fig. 10

INVENTOR.
BY Josef Ivan

United States Patent Office 3,138,998
Patented June 30, 1964

3,138,998
SURFACE FINISHING APPARATUS
Josef Ivan, Gerberstrasse 30, Krefeld, Germany
Filed July 25, 1960, Ser. No. 45,236
Claims priority, application Germany July 27, 1959
10 Claims. (Cl. 90—12)

The present invention relates to a surface finishing apparatus for machining surfaces on machines and especially machine tools, and more particularly it relates to such an apparatus which may be removably secured to the respective machine to be finished.

The slideways of machine beds, especially of machine tools, on which, for example, the carriage, the tailstock, the stays or rests, and the like are slidably mounted, are usually required to have smooth surfaces of the highest possibly accuracy. Due to the wear on the slideways it becomes necessary from time to time, especially in precision machine tools for working on metals, to refinish these slideways. Such a refinishing operation when carried out by hand is very expensive and consumes considerable time. Although special slideway grinding machines have been developed to carry out this work mechanically, these machines have the great disadvantage of being so extremely large, complicated, and expensive that such work is usually reserved for firms specializing in it, which requires that sometimes after being rough-machined, for example, by planing, the machines to be ground have to be shipped to such a specializing firm which possesses such a slideway grinding machine.

It is an object of the present invention to provide a relatively inexpensive apparatus for machining plane surfaces and especially slideways of machines and machine tools.

A further object of the invention is to provide such an apparatus which may be mounted on the machine to be refinished and which is of a relatively small size and weight and can be easily carried from one machine to another, and can also be manipulated by an average mechanic.

For attaining these objects, the present invention provides a surface finishing apparatus which comprises a guide fixture or guide means which may be removably secured to the surfaces or machine parts which are to be machined on the respective machine, and of a machining mechanism which carries the machining tool and is movable along guide faces of the guide fixture. By mounting the guide fixture on the slideways, it is possible to machine them along their entire length and with any desired degree of accuracy without requiring movement of the machine to be refinished out of its normal position. The machining mechanism may have any desired mechanically driven tool, for example, of a milling or planing tool, or a grinding tool. The required operating steps may also be carried out either individually or successively, and it is possible according to the invention not only to overhaul used machines, but also to mill or grind the slideways on a new machine for the first time.

In order to avoid additional control means for operating the machining mechanism the guide fixture according to the invention is preferably designed in accordance with the shape of the surface to be machined, and if this surface consists of a long slideway, the guide fixture has a corresponding long shape, and the length thereof preferably corresponds to at least a considerable part of the length of the surface to be machined. Although in most cases this surface and thus also that of the guide fixture will be straight, it is also possible to design the guide faces of the guide fixture in accordance with any other shape, for example, corresponding to a curved shape of the surface to be machined. In most cases it is also advisable to make the guide fixture of a length substantially in accordance with the total length of the surface to be machined so that the entire surface can be finished in one continuous operation.

The guide fixture according to the invention may include a long supporting beam which may be removably secured at least at its two ends to the machine to be worked on, and which supports the machining mechanism to be used. If this supporting beam is of a considerable length, it may be necessary to secure it at more than two points or at least to brace it at additional points.

The guide fixture may be secured to one slideway, for example, by claws, or on a machine bed with two spaced parallel slideways preferably between the two slideways. The slideways, especially of machine tools, are generally provided with inwardly extending gibs or the like for securing one or more fixtures which are used with the machine. In slideways of this type the guide fixture according to the invention preferably reaches underneath these gibs, is clamped on a stationary part of the machine and braced against these gibs. The guide fixture may then reach under the supporting gibs along their entire length. According to a preferred embodiment of the invention, the guide fixture is, however, provided at least at both ends with a supporting bracket which extends underneath these gibs for securing the supporting beam thereto, and these ends are clamped to a stationary part of the machine, preferably by means of a clamping bolt, and they are braced against the gibs. This embodiment of the invention has the considerable advantage that it may be easily installed.

For adjusting the guide fixture on the machine bed to any desired position relative to the slideways of the machine, the fixture is designed so as to permit it to be pivoted about three different axes which extend at right angles to each other. The adjustment itself is carried out by adjustable elements, for example, by setscrews, which are preferably provided in pairs spaced from each other for the adjustment about each swivel axis.

The guide fixture, for example, the supporting beam, which supports the machining mechanism is preferably provided with two parallel slideways or guide faces for guiding the machining mechanism. The sliding surfaces of these slideways may be tempered or they may also be at least partly provided on plates of a wear-resistant material, for example, steel plates. The machining mechanism may be supported on the slideways by means of slide members, although the most suitable means for guiding the machining mechanism along the slideways have been found to be of adjustable rollers, for example, roller bearings.

According to a preferred embodiment of the invention, the machining mechanism is provided with a longitudinally movable carriage on which a support is mounted so as to be rotatable and adjustable about a vertical axis. This support carries a cross slide which is rotatable about a horizontal axis and may be locked in a fixed position and carries the tool which is preferably driven by a separate motor. By means of such a machining mechanism it is easily possible to machine several slideways which extend parallel to each other and may also be inclined at different angles to a horizontal plane. In order also to be able to machine several slideways at the same time which are spaced at a greater distance from each other, it is advisable to design the support so as to be slidable in the transverse direction and so as to be capable of being locked in a fixed position on the carriage.

For driving the machining mechanism to move the same along the length of the slideways to be machined, a suitable driving element, for example, a threaded spindle, may be provided which extends substantially along the entire length of the guide fixture. This spindle may be driven by means of a separate motor, although it is also possible to connect the spindle to the drive of the machine to be overhauled.

These and other objects, features, and advantages of the present invention will become further apparent from the following detailed description thereof, particularly when the same is read with reference to the accompanying diagrammatical drawings, in which—

FIGURE 10 shows a top plan view of FIGURE 9, but on a smaller scale; while

Figure 1:
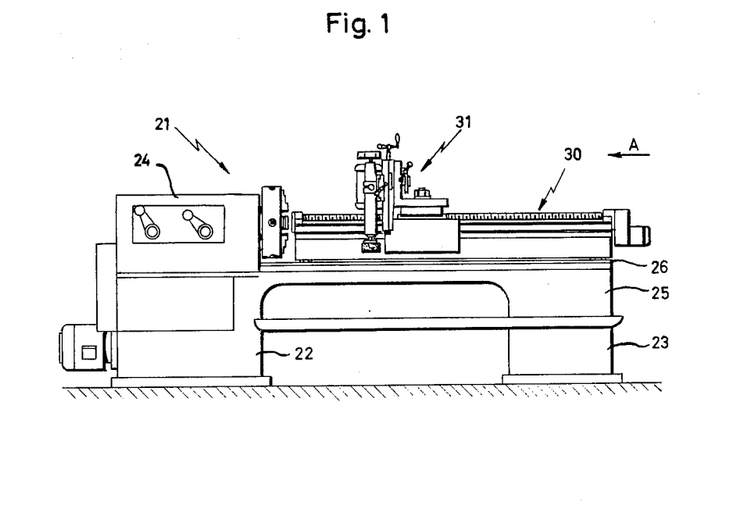
FIGURE 1 shows a front view of a lathe and of a surface finishing apparatus according to the invention mounted on the lathe.
Figure 2:
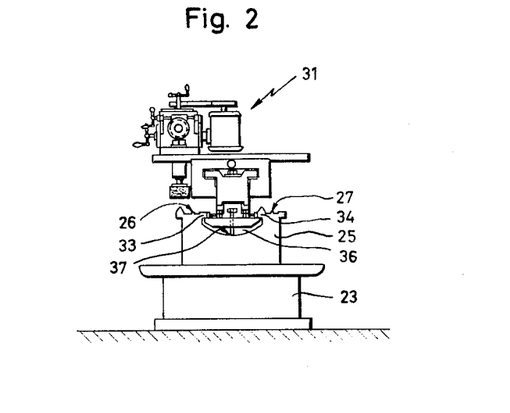
FIGURE 2 shows an end view taken in the direction of the arrow A in FIGURE 1.

Referring to the drawings, FIGURES 1 and 2 diagrammatically illustrate a lathe 21 which has a machine bed 25 mounted on a pair of bases 22 and 23 and a headstock 24 mounted on the bed.

The upper part of the machine bed 25 has parallel surfaces shown to be slideways 26 and 27 on which during the normal operation of the lathe especially the carriage and the tailstock are mounted so as to be slidable and lockable on the slideways. These last-mentioned elements are removed from the machine bed and are replaced by the surface finishing apparatus 30, 31 according to the invention which includes a guide means or guide fixture 30 and a machining mechanism 31 which are required for machining, finishing or refinishing the slideways 26 and 27 of machine bed 25.

Figure 4:
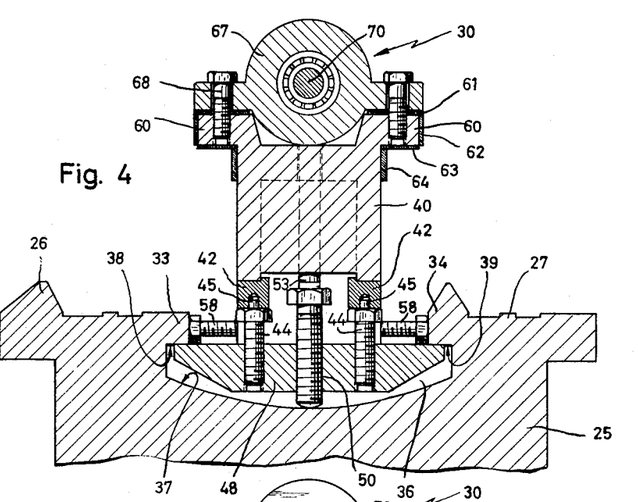
FIGURE 4 shows a cross section taken along line 4—4 in FIGURE 3.
Figure 5:
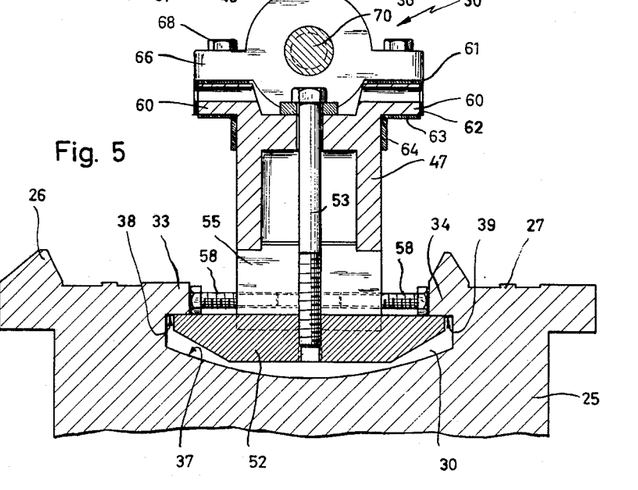
FIGURE 5 shows a cross section taken along line 5—5 in FIGURE 3.
Figure 6:
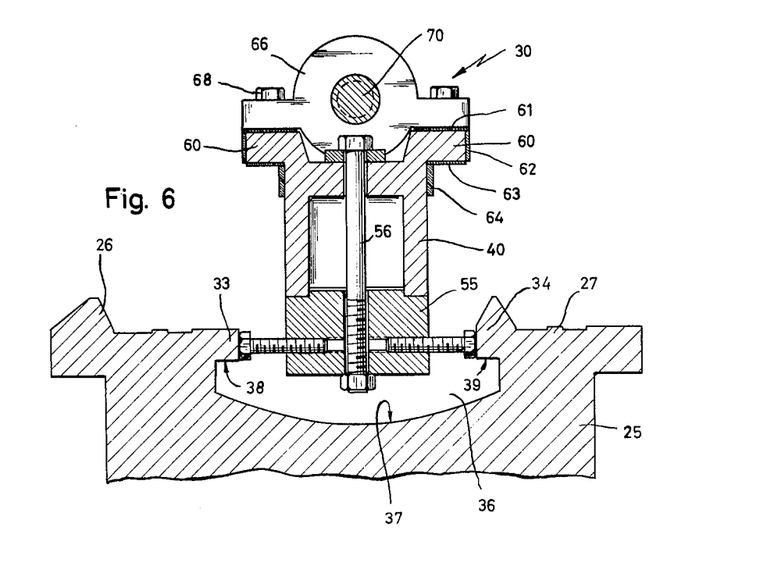
FIGURE 6 shows a cross section taken along line 6—6 in FIGURE 3.

Before describing the surface finishing apparatus in detail, it should be pointed out with reference to FIGURES 4 to 6 that the machine bed 25 of the lathe is also provided with a pair of inwardly extending gibs 33 and 34 underneath and between which a hollow space 36 is provided which has a bottom surface 37. Gibs 33 and 34 are further provided with machined mounting surfaces 38 and 39, respectively, which together with slideways 26 and 27 serve to clamp the mentioned lathe elements, for example, the carriage and the tailstock, in a fixed position at any desired point.

The guide fixture 30 and the manner of installing the same on the machine bed 25 will now be described with reference to FIGURES 3 to 6.

The principal element of this fixture consists of a supporting beam 40 which has a length corresponding to the length of the slideways to be machined. Each end of this beam 40 rests by means of intermediate spacing members 42 on a pair of supporting bolts 44 which are provided at their upper ends with setpins 45 which engage into corresponding apertures in spacing members 42.

Each pair of supporting bolts 44 is screwed into a supporting bracket 48, the lateral sides of which engage with the lower surfaces of gibs 33 and 34 of the machine bed 25 and which is further braced against the bottom surface 37 by means of an adjustable bolt 50.

Figure 3:
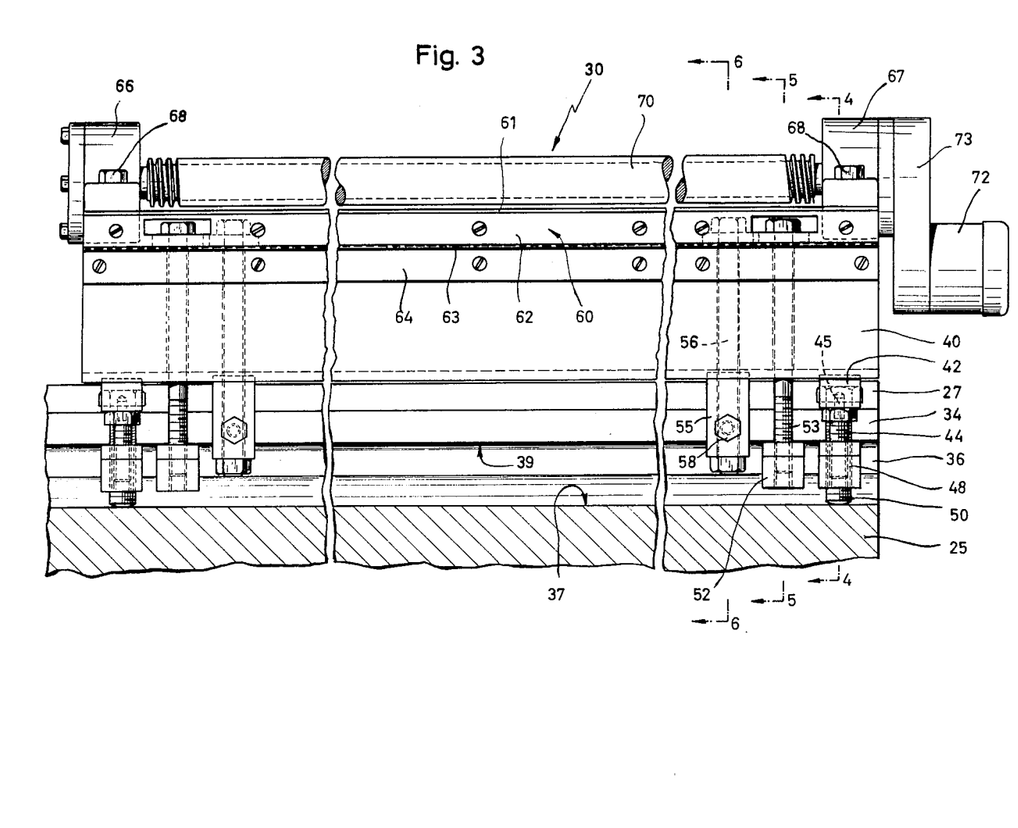
FIGURE 3 shows a front view, partly in section, of a part of the machine bed of the lathe according to FIGURE 1 and of the guide fixture thereon.

As illustrated in FIGURES 3 and 5, closely adjacent to each supporting bracket 48 a clamping bracket 52 is provided which has a shape similar to that of brackets 48. These clamping brackets 52 also extend underneath gibs 33 and 34 and each of them is connected by a tension bolt 53 to beam 40.

Adjacent to the other side of each clamping bracket 52 a transverse-adjustment block 55 is provided, as shown particularly in FIGURES 3 and 6. Each of these blocks 55 is secured to beam 40 by a bolt 56 and by suitable contact surfaces, and each of them has a pair of setscrews 58 which are screwed coaxially into the opposite sides and the heads of which engage against the opposite inner surfaces of gibs 33 and 34.

On its upper part, beam 40 is provided along its opposite longitudinal sides with a pair of parallel guide faces 60, the slide surfaces of which are the surfaces of steel plates 61, 62, and 63. While steel plates 61 and 62 are secured by bolts, each steel plate 63 is held in a fixed position by a holding strip 64.

Each of the two upper ends of beam 40 further carries a bearing 66 or 67, respectively, which is removably secured thereto by bolts 68. These two bearings 66 and 67 rotatably support a worm-gear spindle 70 which is used for driving the machining mechanism 31 by means of a motor 72 which drives spindle 70 through a reduction gear 73.

Now follows a description of the manner of installing and adjusting the guide fixture on the machine bed.

At first, the supporting brackets 48 are applied and are loosely held in position by a slight tightening of bolts 50. These brackets 48 are thereafter shifted until beam 40 with its spacing members 42 are in the proper position relative to slideways 26 and 27 of the machine bed 25.

Either prior to or after inserting the supporting brackets 48 it is also necessary to insert the clamping brackets 52 which at first are likewise only loosely secured by slightly tightening bolts 53. The transverse-adjustment blocks 55 should already be applied to beam 40 before the latter is mounted on the machine. Now follows the adjustment of beam 40. In order to turn beam 40 about its longitudinal axis, the corresponding bolts 44 of both supporting brackets 48 are either tightened or loosened, while for adjusting the position of beam 40 about a horizontal transverse axis, both bolts 44 of one pair in one bracket 48 are adjusted. By adjusting setscrews 58 it is possible to adjust the position of beam 40 about a vertical axis in the direction toward one of the slideways 26 or 27. After beam 40 has been finally adjusted to the proper position, clamping bolts 50 and 53 are tightened so that the entire guide fixture 30 and especially beam 40 and slideways or guide faces 60 thereon will then be secured in a position exactly parallel to slideways 26 and 27 of the machine bed 25.

Now follows a description of the machining mechanism and its essential elements, which is to be read with reference to FIGURES 7 to 10.

This mechanism comprises a carriage 80 which includes a mounting plate 83 and a pair of bearing plates 85 which are spaced from each other and are slidable in slots 101 in plate 83 and are adapted to be secured in a fixed position by means of bolts 102. Mounting plate 83 further carries a nut 81 into which the worm-gear spindle 70 is screwed.

Figure 7:
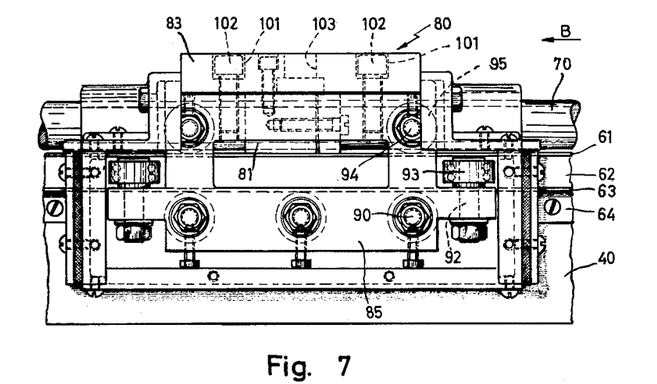
FIGURE 7 shows a front view of the carriage of the machining mechanism, in which a part of the covering of the carriage is removed to disclose the inside thereof, and of a part of the guide fixture and of the machine to be refinished.
Figure 8:
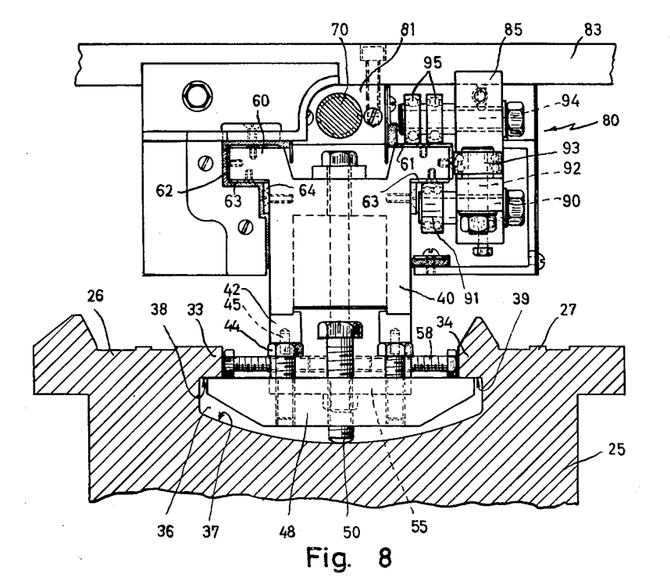
FIGURE 8 shows a view taken in the direction of the arrow B in FIGURE 7, in which the lateral covering of the carriage is partly removed.

Each bearing plate 85 carries a row of roller bearings 91 which are mounted on short axles 90 and are adapted to roll along the surface of one of the steel plates 63. Each bearing plate 85 further carries on each end thereof a short axle 92 on which a roller bearing 93 is mounted. These roller bearings 93 are adapted to roll along the surface of steel plates 62. Finally, each bearing plate 85 carries a short axle 94 on which a pair of roller bearings 95 are mounted which are adapted to roll along the surface of one of the steel plates 61. Due to the three-point contact of bearings 91, 93, and 95 at both sides of beam 40, carriage 80 is guided practically without any play in a straight direction along slideways 60 when spindle 70 is rotated. Axles 90, 92, and 94 are adjustable in their respective axial directions in bearing plates 85 and may be locked in the respective desired position.

Figure 9:
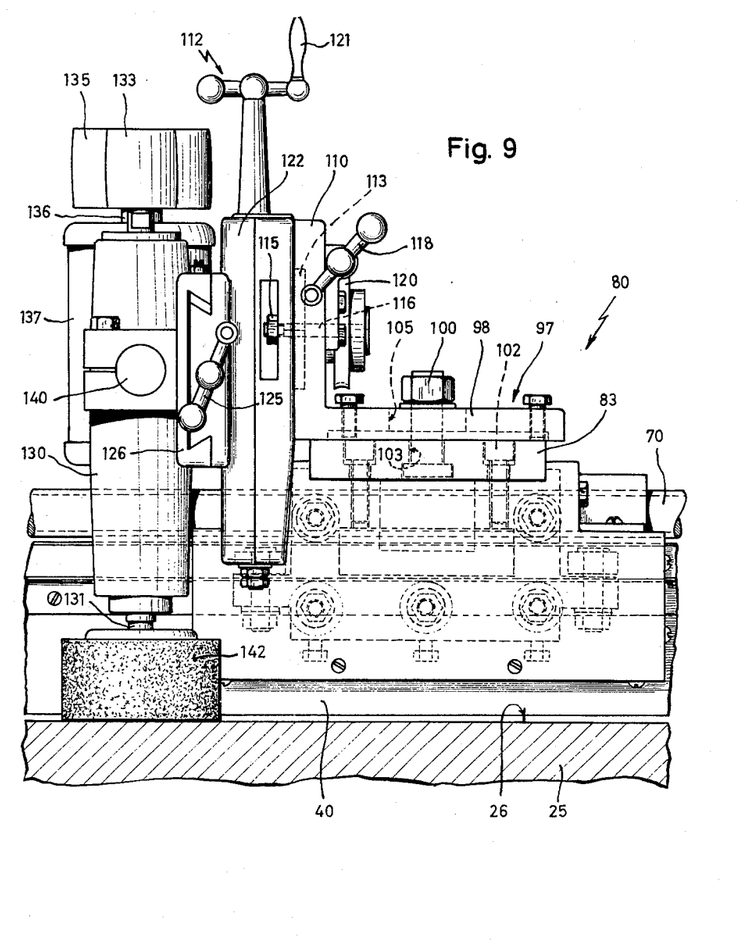
FIGURE 9 shows a view similar to FIGURE 7 but of the entire machining mechanism.
Figure 10:
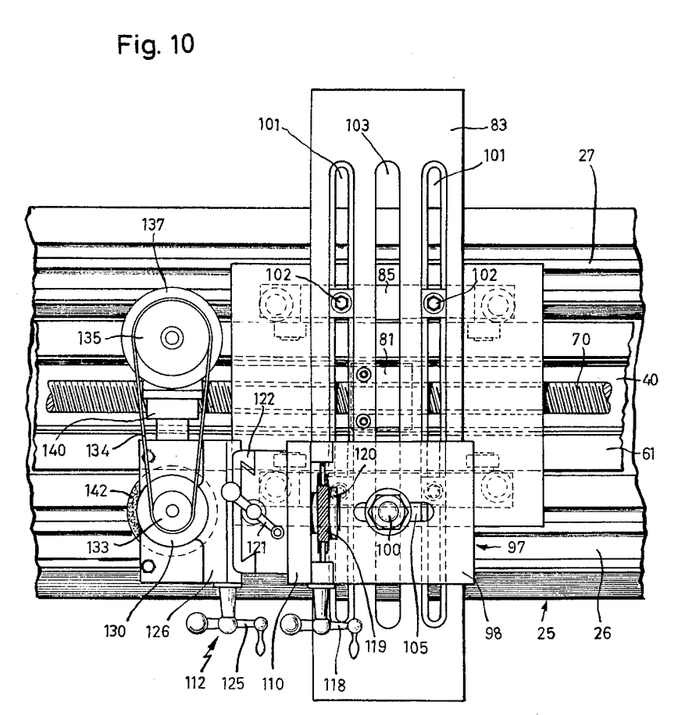

Mounting plate 83 carries on its upper side an angular element 97 which is slidable along a slot 103, as shown in FIGURES 9 and 10, and may be adjusted in a direction transverse to the direction of movement of carriage 80. The horizontal plate 98 of the angular element 97 is further provided with a slot 105 in which a bolt 100 is slidable which also extends through the slot 103 in mounting plate 83 and permits the angular element 97 after being adjusted in the longitudinal and transverse directions, and also after being turned, to be clamped securely in the respective desired position.

The vertical plate 110 of the angular element 97 carries a cross slide 112 which has a projection 113 extending into a corresponding recess in plate 110 to permit the cross slide to be turned about the horizontal axis of a bolt 116 which is nonrotatably connected to the cross slide and may be tightened by a nut 115 to secure the cross slide in any desired angular position. For turning cross slide 112 after nut 115 has been loosened, a handcrank 118 is provided which turns a worm 119 which is in mesh with a worm wheel 120 on bolt 116.

Cross slide 112 is an element which is conventional in most machine tools, so that a more detailed description of its construction may be omitted. It merely needs to be mentioned that the cross slide comprises of a lower slide 122 which is adjustable by a hand crank 121 and a top slide 126 which is adjustable by a hand crank 125. The top slide 126 carries a bearing 130 in which a shaft 131 is rotatably mounted which carries on its upper end a pulley 133 which may be driven through a belt 134 by a pulley 135 on the shaft 136 of an electric motor 137 which is removably secured by a shaft 140 on bearing 130.

On its lower end, shaft 131 carries the required tool which in the embodiment as illustrated consists of a crown-grinding wheel 142 by means of which the slideways 26 and 27 of the lathe may be ground after the grinding wheel has been properly adjusted by cross slide 112. Since this grinding operation is also known as such, the particular adjustments of the grinding wheel by the various control elements of the apparatus need not be further described. It only needs to be mentioned that shaft 131 for driving the tool may be adjusted in any direction so that the grinding operation may be carried out in accordance with any shape of the slideways.

Figure 11:
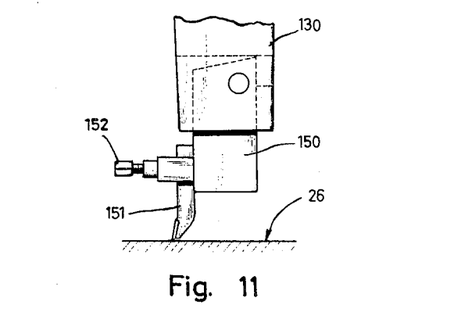
FIGURE 11 shows a side view of another machining tool which may be used in the apparatus according to the invention.

By means of shaft 131 it is also possible to utilize various other kinds of tools, for example, milling cutters for machining the slideways. Furthermore, as illustrated in FIGURE 11, it is possible to insert a tool holder 150 either into the bearing 130 or into another supporting element, and to mount therein a planing tool 151 which by means of a securing device 152 may be adjustably mounted on tool holder 150. By means of this tool 151 it will then be possible to plane the slideways 26 and 27.

From the foregoing description it will be seen that it is possible by means of the apparatus according to the invention to machine or finish any machine surface, for example slideways, by first subjecting them to a rough-machining operation, preferably by planing, and by then grinding or polishing them by the present apparatus. This manner of operation may be advisable when the slideways are worn very badly or when new machine beds are to be finished. In some cases it may, however, be sufficient if the slideways are merely ground and polished by means of the present apparatus.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In apparatus for machining an elongated surface of a machine portion, comprising an elongated guide means; attaching means mounted on said machine portion and including bracing means adjustable in a direction transverse to said surface for detachably bracing said guide means on said machine portion in a position parallel with said surface; a machining mechanism mounted on said guide means for movement along the same and including a tool, and means for mounting said tool movable into engagement with said surface; and means for moving said machining mechanism along said guide means.

2. An apparatus for machining an elongated surface of a machine portion, comprising an elongated guide means having elongated guide faces; attaching means mounted on said machine portion and including bracing means adjustable in a direction transverse to said surface for detachably securing said guide means to the machine portion in a position in which said guide faces are disposed parallel with said surface; a machining mechanism mounted on said guide means for movement along said guide faces and including a tool, and means for mounting said tool movable into engagement with each of said surfaces; and means for moving said machining mechanism along said guide means.

3. An apparatus for machining elongated parallel surfaces of two parts of a machine, comprising an elongated guide means having elongated guide faces; attaching means for detachably securing said guide means to said parts of said machine in a position in which said guide faces are disposed parallel with said surfaces; a machining mechanism mounted on said guide means for movement along said guide faces and including a tool, and means for mounting said tool movable into engagement with each of said surfaces; and means for moving said machining mechanism along said guide means.

4. An apparatus for machining elongated planar surfaces of two elongated parts of a machine, comprising an elongated guide means having planar guide faces; attaching means for detachably securing the ends of said guide means to said elongated parts of said machine in a position in which said planar guide faces are disposed parallel with said surfaces; a machining mechanism mounted on said guide means for movement along said guide faces and including a tool, and means for mounting said tool movable into engagement with each of said surface; and means for moving said machining mechanism along said guide means.

5. An apparatus for machining elongated surfaces of two elongated parallel parts of a machine, comprising an elongated guide means having elongated guide faces; attaching means for detachably securing said guide means to said parts of said machine in a position in which said guide faces are disposed parallel with said surfaces, said attaching means including a first means adjustable for adjusting the height of said guide means, and a second means adjustable for positioning said guide means in a transverse direction; a machining mechanism mounted on said guide means for movement along said guide faces and including a tool, and means for mounting said tool movable into engagement with each of said surfaces; and means for moving said machining mechanism along said guide means.

6. An apparatus for machining elongated surfaces of two elongated parts of a machine, comprising an elongated guide beam having a head with a top face, lateral faces, and bottom faces; attaching means for detachably securing said guide beam to said parts of said machine in a position in which said faces are parallel with said surfaces; a machining mechanism mounted on said guide beam for movement along the same, and including roller means in contact with said top face, said lateral faces, and said bottom faces of said head, a carrier for said roller means, a tool, and means for mounting said tool on said carrier movable into engagement with each of said surfaces; and means for moving said machining mechanism along said guide beam.

7. An apparatus for machining planar surfaces of a machine, comprising, guide means having elongated planar guide faces; securing means for removably securing said guide means to parts of the machine having two parallel planar slideways rigidly connected thereto so that said guide faces extend parallel to said slideways; a bracing means adjustable to adjust said guide means to a position in which said guide faces are parallel with said slideways; a machining mechanism mounted on said guide means for movement along said guide faces; and means for moving said machining mechanism along said guide faces.

8. An apparatus as set forth in claim 7 in which said machine parts having said slideways are mounting gibs projecting toward each other, wherein said bracing means include members adapted to engage the undersides of said gibs, and adjustable means for bracing said guide means against the machine to press said members against said gibs.

9. An apparatus as set forth in claim 7 wherein said mechanism comprises a carriage movable along said guide faces, a support on said carriage for turning movement about a vertical axis, means for securing said support in said turned positions, a cross slide mounted on said support for turning movement about a horizontal axis, means for turning said cross slide about said horizontal axis, means for securing said cross slide in turned positions, a tool mounted on said cross slide, and a motor for driving said tool.

10. An apparatus as set forth in claim 9 and comprising means for adjusting said support in a direction transverse to said guide faces and to the direction of movement of said carriage, said support being mounted on said carriage for movement in said transverse direction.

References Cited in the file of this patent
UNITED STATES PATENTS

| | | |
|---|---|---|
| 1,437,813 | MacPherson | Dec. 5, 1922 |
| 1,775,000 | Sickel | Sept. 2, 1930 |
| 2,660,096 | Morton | Nov. 24, 1953 |

FOREIGN PATENTS

| | | |
|---|---|---|
| 554,443 | Canada | Mar. 18, 1958 |